US008806360B2

(12) United States Patent  (10) Patent No.: US 8,806,360 B2
Cramer et al.  (45) Date of Patent: Aug. 12, 2014

(54) COMPUTING RESOURCE MANAGEMENT IN INFORMATION TECHNOLOGY SYSTEMS

(75) Inventors: Keith D. Cramer, Pine Island, MN (US); Todd M. Eischeid, Cary, NC (US); Mark E. Molander, Cary, NC (US); Gregory B. Pruett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 12/976,882

(22) Filed: Dec. 22, 2010

(65) Prior Publication Data

US 2012/0166991 A1    Jun. 28, 2012

(51) Int. Cl.
*G06F 3/048* (2013.01)
*H04L 12/24* (2006.01)

(52) U.S. Cl.
CPC ................................ *H04L 41/22* (2013.01)
USPC ............................................... 715/771

(58) Field of Classification Search
CPC .................................................. H04L 41/22
USPC ............................................... 715/771
See application file for complete search history.

(56) References Cited

U.S. PATENT DOCUMENTS

| | | |
|---|---|---|
| 5,670,993 A | 9/1997 | Greene et al. |
| 5,790,127 A | 8/1998 | Anderson et al. |
| 5,913,920 A | 6/1999 | Adams et al. |
| 6,271,839 B1 | 8/2001 | Mairs et al. |
| 6,437,803 B1 | 8/2002 | Panasyuk et al. |
| 6,505,239 B1 | 1/2003 | Kobata et al. |
| 6,664,969 B1 | 12/2003 | Emerson et al. |
| 6,806,885 B1 | 10/2004 | Piper et al. |
| 6,922,724 B1 | 7/2005 | Freeman et al. |
| 6,931,458 B2 | 8/2005 | Bolian et al. |
| 6,961,908 B2 | 11/2005 | Phillips |
| 6,964,006 B2 | 11/2005 | Aoki et al. |
| 7,079,642 B2 | 7/2006 | Jerijian et al. |
| 7,181,455 B2 | 2/2007 | Wookey et al. |
| 7,197,712 B2 | 3/2007 | Muehlhausen |
| 7,348,987 B2 | 3/2008 | Willis et al. |
| 7,523,196 B2 | 4/2009 | Dostert et al. |

(Continued)

OTHER PUBLICATIONS

Visionapp AG, "visionapp Remote Desktop 2010 (vRD 2010)—Convenient System Management", Oct. 2009, pp. 1-16, Germany, downloaded Dec. 13, 2010 from http://visionapp.com/fileadmin/02Datasheets/vRD2010_Convenient_RDP_Management_EN.pdf#page=1&view=FitView.

(Continued)

*Primary Examiner* — Peiyong Weng
(74) *Attorney, Agent, or Firm* — Kenneth L. Sherman, Esq.; Michael Zarrabian, Esq.; Sherman & Zarrabian LLP

(57) ABSTRACT

A computing resource management system maintains plural sessions for managing plural computing resources using an administration console. The system further maintains a management user interface on an electronic display screen of the administration console. The management user interface includes plural tabbed user interface elements, wherein each user interface element corresponds to a session for managing a computing resource via a communication link. The system dynamically refreshes the status of each computing resource in a corresponding user interface element tab in the management user interface. User interaction with a user interface element based on user input is monitored, and based on the user interaction with a user interface element, display a panel is displayed on the display for the user managing the corresponding computing resource.

17 Claims, 12 Drawing Sheets

(56) References Cited

U.S. PATENT DOCUMENTS

| | | |
|---|---|---|
| 7,533,189 B2 | 5/2009 | Mahajan et al. |
| 7,536,657 B2 | 5/2009 | Shimizu et al. |
| 7,757,004 B2 | 7/2010 | Mahajan et al. |
| 7,761,622 B2 | 7/2010 | Nguyen |
| 7,844,848 B1 | 11/2010 | Hobbs |
| 7,890,570 B2 | 2/2011 | Mazzaferri |
| 7,895,521 B2 | 2/2011 | Bhogal et al. |
| 7,962,552 B2 | 6/2011 | Clark et al. |
| 8,112,513 B2 | 2/2012 | Margulis |
| 8,112,518 B2 | 2/2012 | Underhill |
| 8,117,314 B2 | 2/2012 | Croft et al. |
| 8,127,233 B2 | 2/2012 | McDowell |
| 8,200,896 B2 | 6/2012 | Schmieder et al. |
| 8,234,577 B1 | 7/2012 | Hardebeck et al. |
| 8,254,704 B2 | 8/2012 | Lu et al. |
| 8,255,536 B2 | 8/2012 | Chen |
| 8,286,002 B2 | 10/2012 | Kamat et al. |
| 8,307,290 B2 | 11/2012 | Liu |
| 2004/0048233 A1 | 3/2004 | Matthews et al. |
| 2004/0249885 A1 | 12/2004 | Petropoulakis et al. |
| 2006/0089992 A1 | 4/2006 | Blaho |
| 2006/0184349 A1 | 8/2006 | Goud et al. |
| 2006/0230156 A1 | 10/2006 | Shappir et al. |
| 2006/0282855 A1 | 12/2006 | Margulis |
| 2009/0235177 A1* | 9/2009 | Saul et al. .............. 715/740 |
| 2010/0050111 A1 | 2/2010 | Duffy |
| 2010/0156913 A1 | 6/2010 | Ortega et al. |
| 2010/0268762 A1 | 10/2010 | Pahlavan et al. |
| 2010/0268813 A1 | 10/2010 | Pahlavan et al. |
| 2010/0268828 A1 | 10/2010 | Pahlavan et al. |
| 2010/0268940 A1 | 10/2010 | Pahlavan et al. |
| 2010/0268941 A1 | 10/2010 | Pahlavan et al. |
| 2010/0271479 A1* | 10/2010 | Heydlauf .............. 348/143 |
| 2011/0047472 A1* | 2/2011 | West et al. .............. 715/740 |
| 2012/0151360 A1 | 6/2012 | Molander et al. |
| 2012/0166957 A1 | 6/2012 | Cramer et al. |
| 2012/0166958 A1 | 6/2012 | Cramer et al. |
| 2012/0226742 A1 | 9/2012 | Momchilov et al. |

OTHER PUBLICATIONS

Softpedia, "Remote Desktop Management Solution for Professionals", 3 p., Romania, downloaded Dec. 13, 2010 from http://www.softpedia.com/get/Internet/Remote-Utils/EMCO-Remote-Desktop-Professional.shtml.

U.S. Non-Final Office Action for U.S. Appl. No. 12/976,902 mailed Oct. 12, 2012.

U.S. Non-Final Office Action for U.S. Appl. No. 12/976,915 mailed Oct. 24, 2012.

U.S. Final Office Action for U.S. Appl. No. 12/976,902 mailed Jan. 4, 2013.

U.S. Final Office Action for U.S. Appl. No. 12/976,915 mailed Feb. 28, 2013.

U.S. Notice of Allowance for U.S. Appl. No. 12/964,546 mailed Aug. 5, 2013.

03AM Laboratories PL, "RemotelyAnywhere, Version 4.70", Remotely Anywhere, downloaded at http://www.remotelyanywhere.com/remotelyanywhere.pdf, 2002, pp. 1-250, Hungary.

U.S. Non-Final Office Action for U.S. Appl. No. 12/964,546 mailed Dec. 4, 2012.

U.S. Final Office Action for U.S. Appl. No. 12/964,546 mailed May 14, 2013.

U.S. Non-Final Office Action for U.S. Appl. No. 12/976,902 mailed Oct. 1, 2013.

U.S. Non-Final Office Action for U.S. Appl. No. 12/976,915 mailed Aug. 20, 2013.

U.S. Final Office Action for U.S. Appl. No. 12/976,902 mailed Jan. 14, 2014.

U.S. Final Office Action for U.S. Appl. No. 12/976,915 mailed Jan. 14, 2014.

* cited by examiner

COMPUTING RESOURCE MANAGEMENT IN INFORMATION TECHNOLOGY SYSTEMS

BACKGROUND OF THE INVENTION

1. Field of the Invention

The present invention relates generally to content presentation and in particular to content presentation for computing resource management.

1. Background Information

Administrators often use management systems to manage servers. This is performed as needed for each server, one at a time. Administrators are responsible for managing an increasing numbers of servers. There may also be simultaneous problems on multiple servers. A top goal of an administrator is to identify and address server problems as quickly as possible, requiring a management system that assists in achieving that goal.

BRIEF SUMMARY OF THE INVENTION

Embodiments of the invention provide content presentation using user interfaces for managing computing resources. According to an embodiment of the invention, a computing resource management system maintains plural sessions for managing plural computing resources using an administration console. The system further maintains a management user interface on an electronic display screen of the administration console. The management user interface includes plural tabbed user interface elements, wherein each user interface element corresponds to a session for managing a computing resource via a communication link. The system dynamically refreshes the status of each computing resource in a corresponding user interface element tab in the management user interface. User interaction with a user interface element based on user input is monitored, and based on the user interaction with a user interface element, a panel is displayed on the display for the user managing the corresponding computing resource.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

Figure 1A:
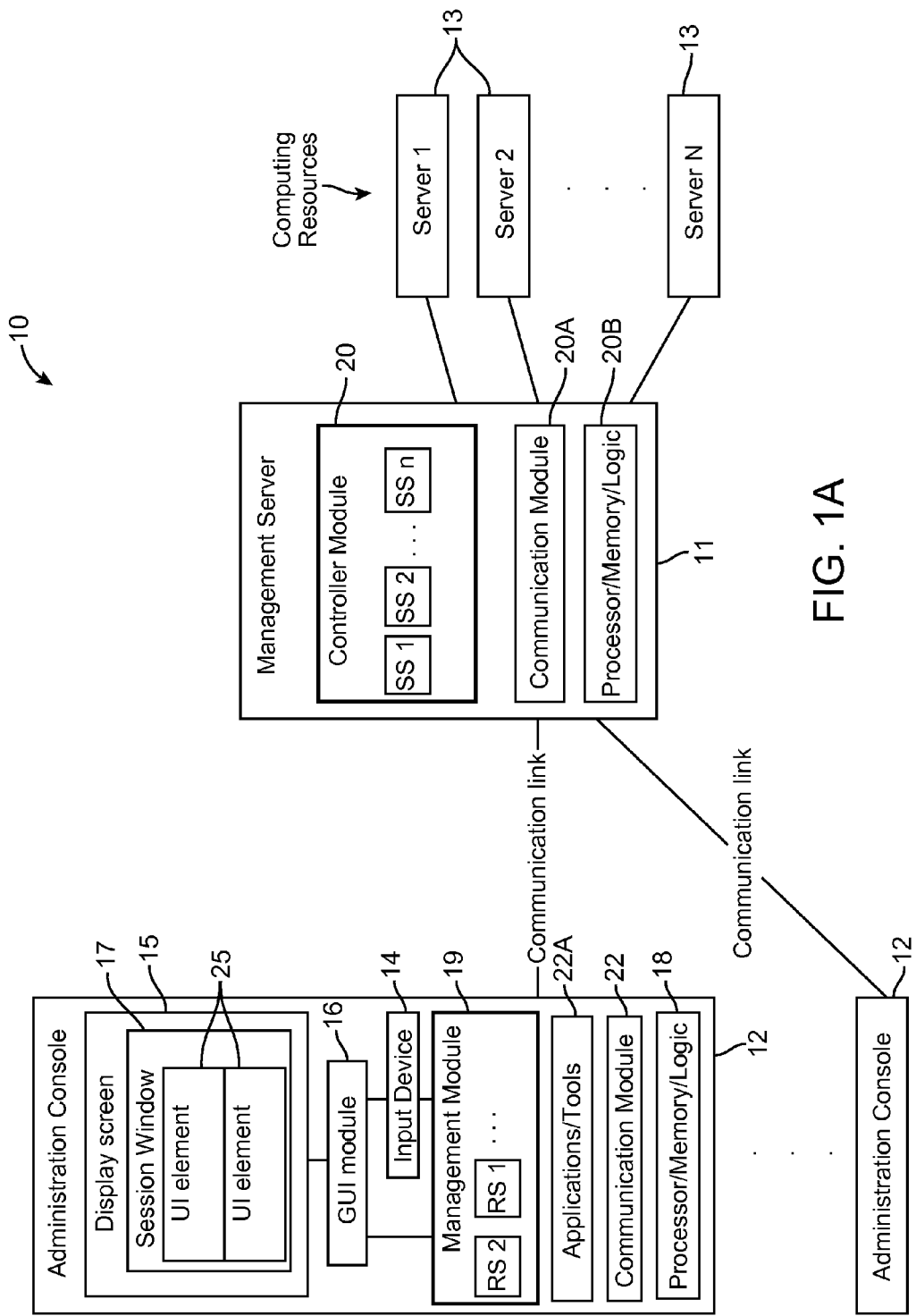
FIG. 1A illustrates a system for content presentation, according to one embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for content presentation, as well as operation and/or component parts thereof. While the following description will be described in terms of content presentation systems and processes for clarity and placing the invention in context, it should be kept in mind that the teachings herein may have broad application to all types of systems, devices and applications.

Embodiments of the invention provide content presentation on electronic displays in a management system, for managing computing resources such as servers, server components, applications, tools, modules, etc., via one or more administration consoles.

In one embodiment of the invention, remote sessions are established on administration consoles for managing multiple servers. The remote sessions provide management user interfaces for remotely managing (i.e., monitoring and/or controlling) servers in information technology systems. A remote administration console can be used to remotely manage multiple servers, or multiple components of a server. In one example, a remote administration console comprises a client computer system, and a server comprises one or more servers such as blade servers.

According to embodiments of the invention, the management user interfaces include user interface elements that represent the computing resources being remotely managed. As such, in one embodiment of the invention content presentation comprises providing a management UI on an electronic display monitor of an administration console, wherein the management UI includes dynamic UI elements such as visual tabs for managed computing resources. Further, content presentation includes providing dynamic visual tabs in the management UI for tools, sessions, and management panels via a single tabbed management UI for managing computing resources.

According to embodiments of the invention, with UI elements representing tools (e.g., applications), remote sessions and server user interface panels as thumbnail tabs available in a management UI on a tabbed bar, an operator can switch among the various thumbnail tabs for managing various computing resources. In one example, this allows transferring information between multiple panels to manage computing resources. Thumbnail tabs allows the user to preemptively use information such as initiating a long-running task using a thumbnail tab, while using another thumbnail tab for monitoring the long running task via its thumbnail.

Embodiments of the invention provide dynamic visual tabs such as session thumbnails in the management UI representing sessions on administration consoles for servers being managed. A tabbed user interface in the management UI is provided which allows a view of each server being managed via a tab, along with facilitating delving into any of the dynamic sessions via a single click by selecting a desired tab.

Embodiments of the invention provide a tabbed user interface for dynamically displaying remote sessions as UI elements for monitoring computing resources such as servers, server components, applications, software tools, module, etc. In one embodiment, the UI elements comprise thumbnail sessions corresponding to said remote sessions for computing resource management. When an operator interacts with a UI element (such as by clicking, or placing a mouse pointer, on the UI element) a panel such as a window panel is displayed with more detailed status information of a corresponding computing resource being managed (e.g., monitored and/or controlled). Such a tabbed UI allows an operator (e.g., an administrator) to randomly access, and transition between, various overlaying panels for managing the computing resources.

Embodiments of the invention further provide visual indicators along with the thumbnails in the management UI to guide a user to information for possible investigation. For example, an error screen on a managed server indicating a sever error may be given additional emphasis in the management UI on an administration console, such as flashing the session thumbnail of that managed server, placing a red border around the session thumbnail, placing a red icon on top of the session thumbnail, etc. For less severe issues (such as the completion of a long running command in a console session), indications such as a checkmark icon may be overlaid on a session thumbnail or adjacent to it. This provides a user (administrator) more independence in opening other sessions and performing work while waiting for the checkmark to appear.

An embodiment of the invention is described below in relation to a management session. The management session includes a management UI represented as a graphical user interface (GUI) implemented on an administration console for managing servers such as blade servers in information technology systems. Managing a server may include monitoring and/or controlling the server.

The management session on an administration console comprises one or more remote sessions, wherein the management session provides said management UI including UI elements, each UI element representing a server being remotely managed. An administration console is used to manage multiple servers using the management UI.

FIG. 1A shows a block diagram of an information technology system 10 according to an embodiment of the invention. The system 10 comprises a management server 11 and one or more administration consoles 12, wherein the management server 11 is configured for connection to each administration console 12 via a communication link. The management server 11 is connected to multiple servers 13 to be managed.

In one embodiment, an administration console 12 includes an input device 14, an electronic display screen 15, a GUI module 16 configured for controlling display of content elements such as UI elements, tabs, thumbnails, panels and windows on the display screen 15. The administration console 12 further includes a communication module 22 (such as a network interface module) configured for information communication over a communication link (e.g., network, channel, wireless link), a processing module 18 including processor, memory and logic, and a management module 19 configured for providing a management session comprising at least one remote session (RS) on the administration console 12 for managing computing resources (such as server 13, components of the servers 13, applications, tools, etc.) via the management server 11.

A managed server may have multiple remote sessions at the administration console for managing server components (e.g., virtual machines, storage, etc.) of that server. The management module further provides a management UI such as a management session window 17 that allows a user to manage computing resources.

The management module 19 along with the management server 11 allow operators to manage servers from an administration console 12. A controller module 20 in the management server 11 enables processing and communication between the administration consoles 12 and the management server 11, thereby enabling a number of active remote sessions RS at each administration console 12 for managing one or more servers and managing one or more components of each server. The management server further includes a communication module 20A and hardware 20B.

Figure 1B:
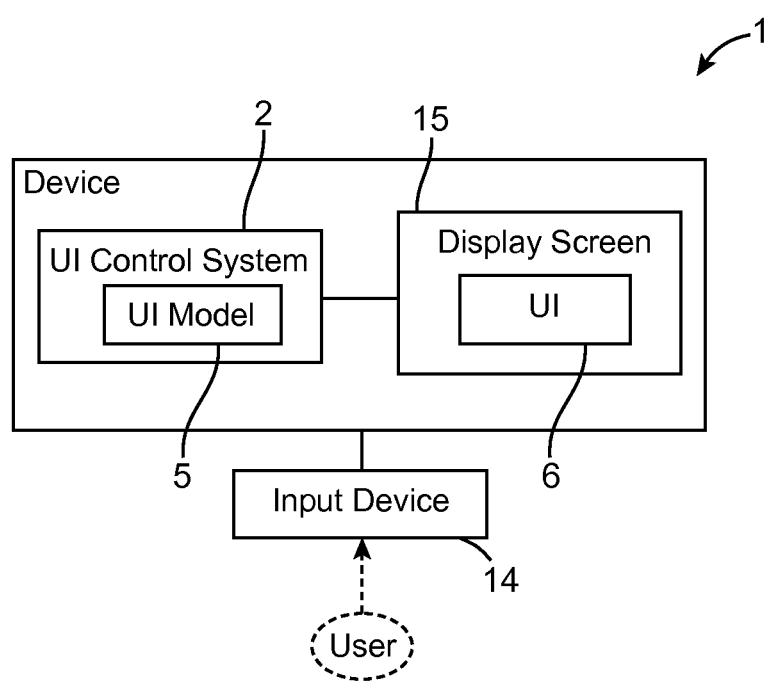
FIG. 1B illustrates a system model for content presentation, according to one embodiment of the invention.

The GUI module 16 and the management module 19 form a UI control system 2 (FIG. 1B) for an information technology system 1. The UI control system 2 provides content presentation in a user interface 6 (such as the management UI window 17 in FIG. 1A) on an electronic display screen/monitor 15. The user interface 6 includes UI elements (such as UI elements 25 in FIG. 1A). The UI control system 2 controls the user interface 6 and the GUI elements therein, based on user input (input event) via the input device 14.

In one embodiment, the UI control system 2 includes a UI model 5 including factors which dictate system response based on user interaction with the UI elements and based on other factors such as status of servers being monitored. In one embodiment, the UI model 5 may comprise a look-up table or programming of factors which dictate system response based on user interaction with a UI element for each of a number of factors (e.g., user input such as pointer motion, pointer location, pointer hover, mouse-over), as described further below. The factors of the UI model 5 may be updated/modified as desired for various desired behaviors.

Figure 2A:
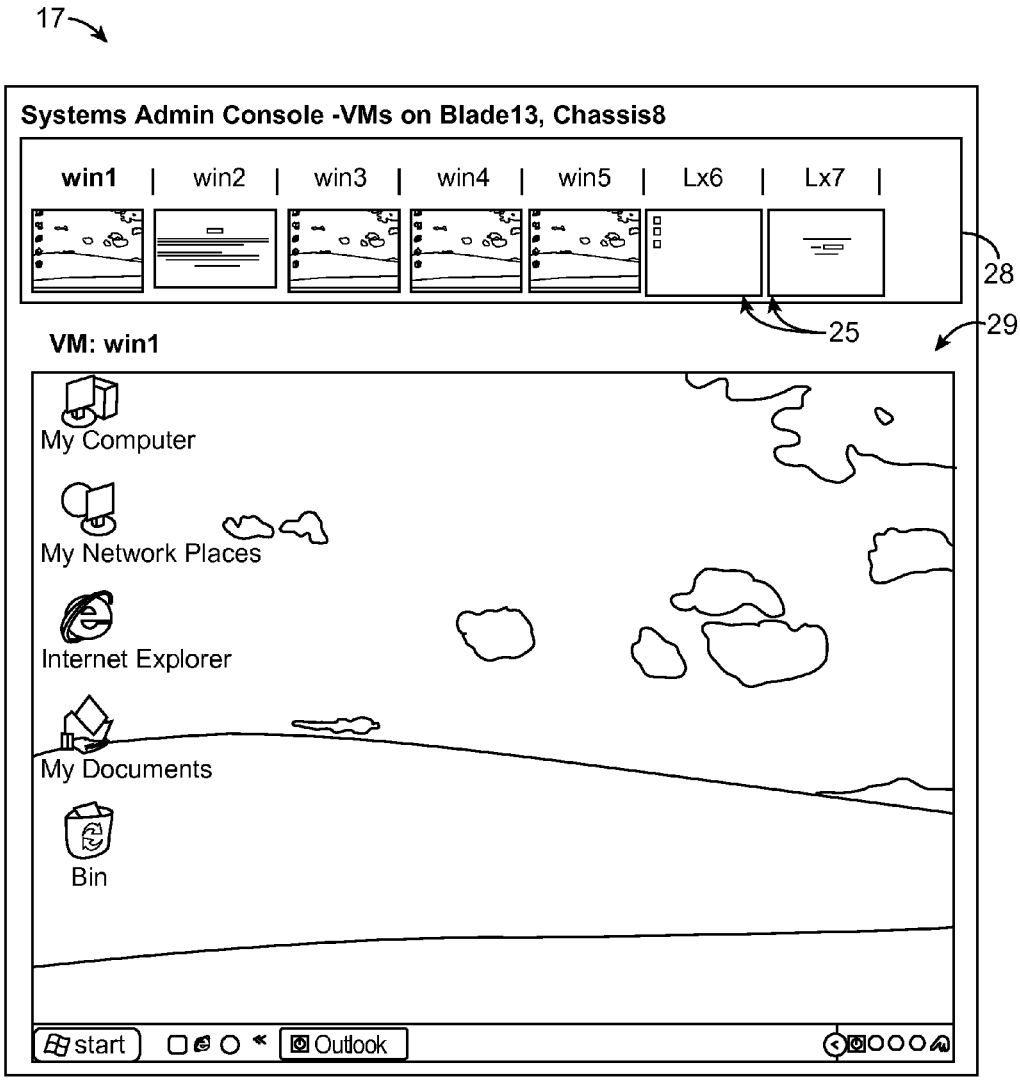
FIG. 2A illustrates a management user interface comprising a tabbed session window including user interface (UI) elements for managing tools and/or multiple computing resources using content presentation, according to one embodiment of the invention.

FIG. 2A shows an example management UI window 17 including UI elements 25, wherein each UI element corresponds to a virtual machine (VM) running on a server 13 such as a blade server. In this example, the UI elements 25 comprise thumbnail tabs organized on tab bar 28. Each UI element 25 comprises a thumbnail of screen output of a corresponding VM at the server. As such, each of the several VMs of the server 13 is viewable in a dynamic thumbnail 25 in the window 17. Each thumbnail 25 is on tab on a tab area 28. This allows the user to use the dynamic visual tabs to help guide them in managing servers and server components.

Figure 2B:
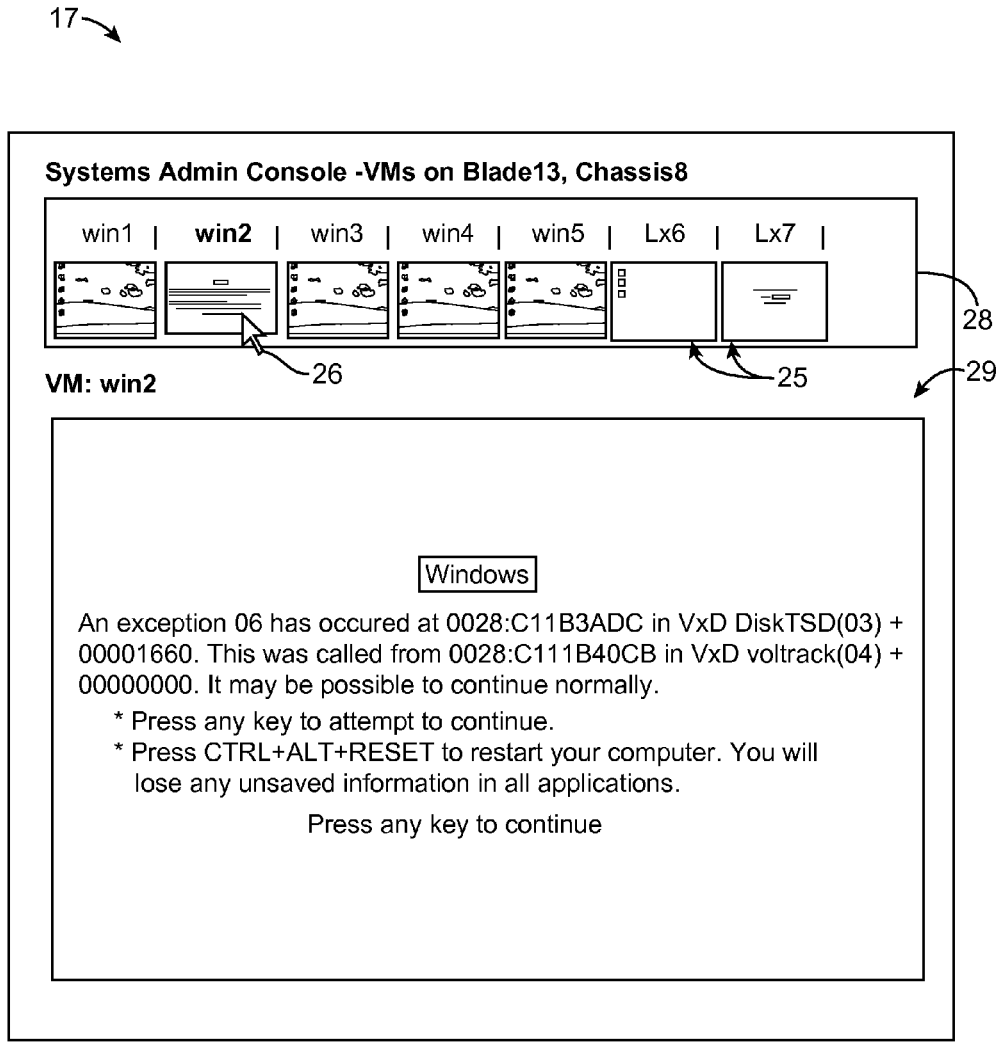
FIG. 2B illustrates a tabbed session window including tabbed thumbnails, and example user interaction with the tabbed thumbnails for managing tools and/or multiple computing resources using content presentation, according to one embodiment of the invention.

As illustrated in FIG. 2A, in one embodiment of the invention the user (administrator) is managing seven VM sessions (i.e., win1, win2, win3, win4, win5, Lx6, Lx7). In this example, initially the user has selected the thumbnail tab 25 for VM win1 wherein a panel 29 shows the full screen output of VM win1 (i.e., an enlarged version of the information in the thumbnail for VM win1). The user notices that that VM win2 has encountered an error as visible in the corresponding thumbnail tab 25. As illustrated in FIG. 2B, in one embodiment of the invention the user selects (e.g., clicks via a mouse pointer 26) the thumbnail tab 25 for VM win2, wherein an enlarged screen of the VM win2 is displayed on panel 29. The user may then manage (e.g., control, monitor) VM win2 through the panel 29 (e.g., restart VM win5, etc.).

Figure 2C:
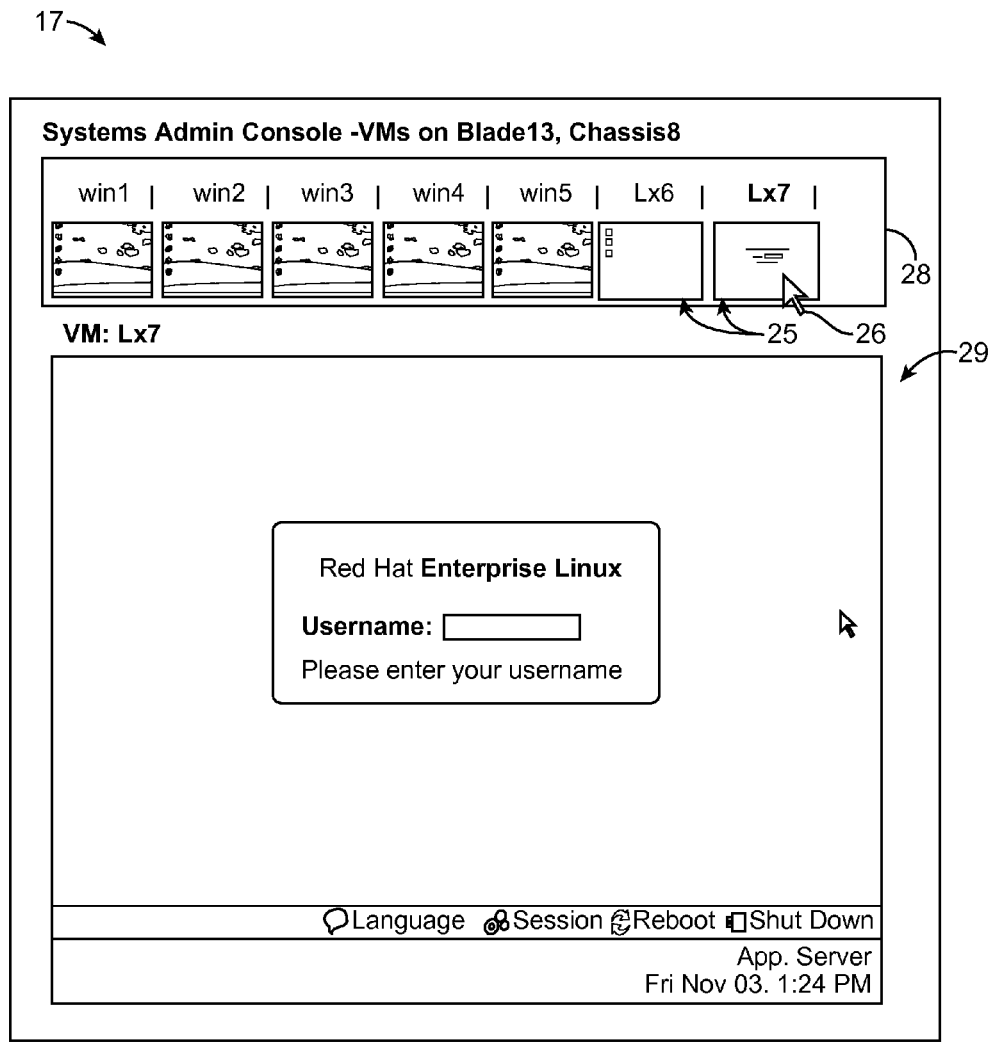
FIG. 2C illustrates a tabbed session window including tabbed thumbnails, and another example user interaction with the tabbed thumbnails for managing tools and/or multiple computing resources using content presentation, according to one embodiment of the invention.

After managing VM win2, the user elects to manage VM Lx7. From the thumbnail 25 for VM Lx7 (without selecting/enlarging the thumbnail for VM Lx7), the user can view that VM Lx7 requires a login and password. The dynamic thumbnail tab 25 preemptively helps guide the user in obtaining the login and password information. The user may obtain such information in various ways. In one example, when such information is not immediately at the disposal of the user, the user may send electronic mail (email) to an operator to obtain such information. The user may then perform other operations such as managing other VMs. Later when the operator responds to the email with the information, the user selects (e.g., clicks via a mouse pointer 26) the thumbnail tab 25 for VM Lx7 as illustrated in FIG. 2C according to an embodiment of the invention, wherein an enlarged screen of the VM Lx7 is displayed on panel 29. The user may then enter the login and password information into panel 29 for VM Lx7 to further interact with VM Lx7.

Figure 2D:
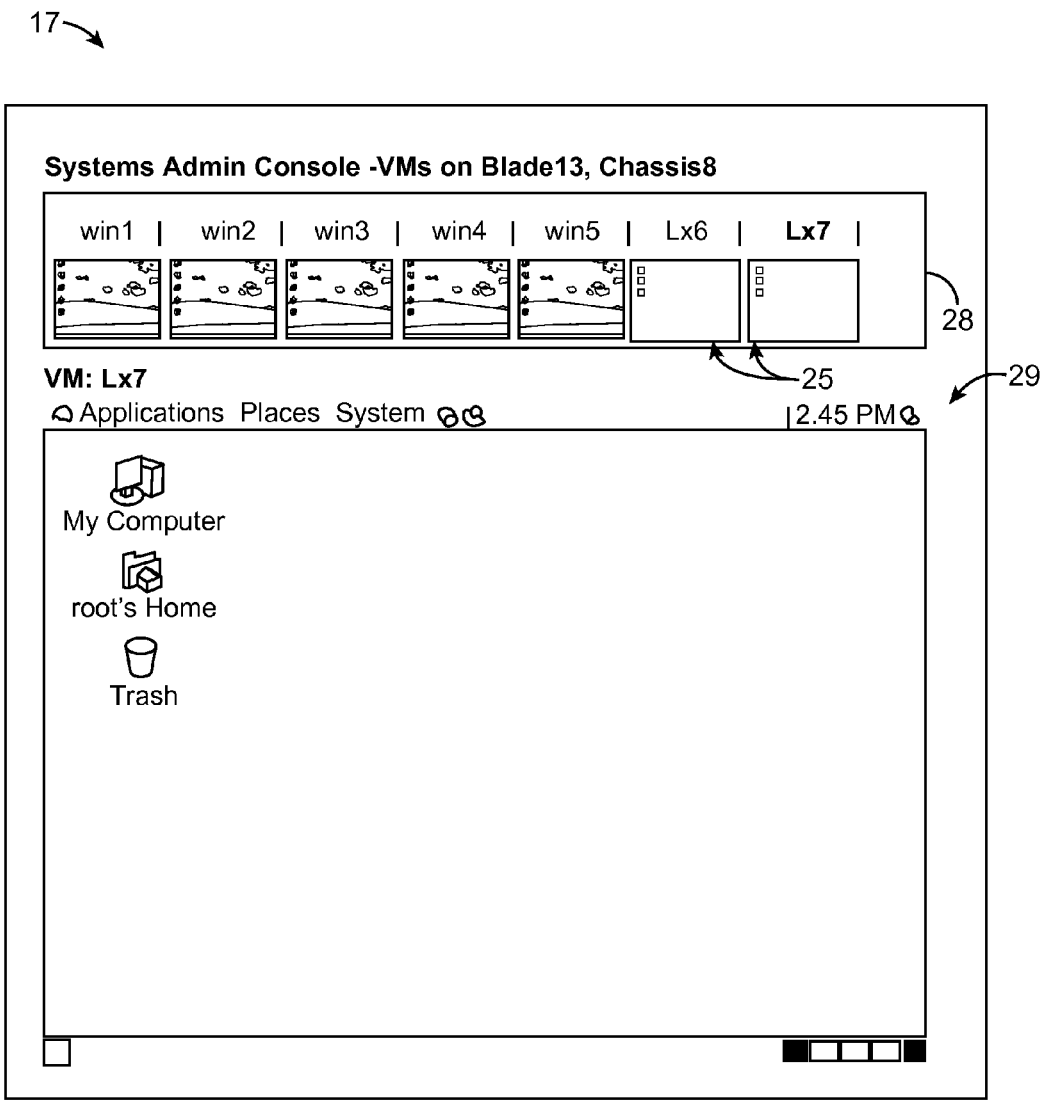
FIG. 2D illustrates a tabbed session window including tabbed thumbnails, and another example user interaction with the tabbed thumbnails for managing tools and/or multiple computing resources using content presentation, according to one embodiment of the invention.

As illustrated in FIG. 2D, in one embodiment of the invention after the user logs into VM Lx7, the dynamic thumbnail for VM Lx7 changes in real time to reflect the current screen output of VM Lx7. This is useful to reinforce that the dynamic thumbnails 25 can be relied on.

Figure 2E:
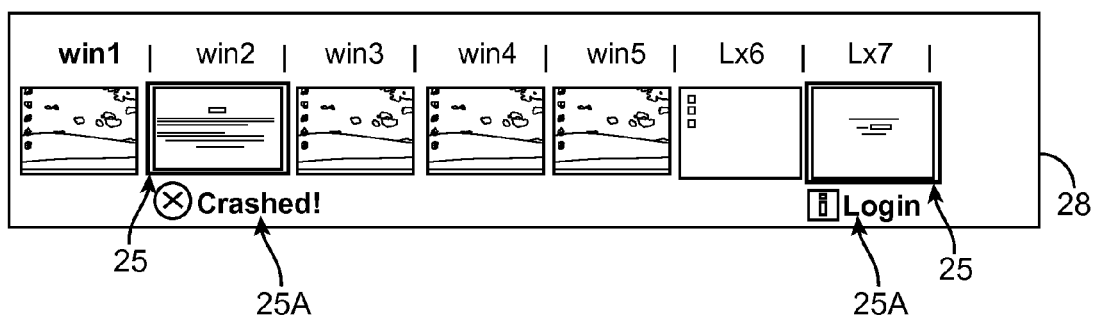
FIG. 2E illustrates a tabbed session window including tabbed thumbnails, and another example user interaction with the tabbed thumbnails for managing tools and/or multiple computing resources using content presentation, according to one embodiment of the invention.

In one embodiment of the invention, as illustrated in FIG. 2E, additional informative information 25A may be displayed near thumbnail 25 in the management UI window 17 (such as in the tab bar 28). Such information may include additional visual cues such as icons and text and other additional emphasis on events that guide the user to the appropriate thumbnail for managing servers, as well as preparing the user for taking action. These additional visual cues may be triggered directly from the underlying events captured by the system (e.g., by the management server 11), or by an analysis of the image in the thumbnails 25. For example, characteristics of a system crash, including visual characteristics on the server screen outputs, may be monitored/detected by the management module 19 (e.g., color tone, two colors, homogeneity of a particular color, text, a login entry field in the middle of a screen, etc.). Other characteristics such as command failure may be monitored for a long running command (e.g., command prompt retuned).

Embodiments of the invention further provide integration of sessions, views, and tools that an administrator utilizes in managing servers. One example of such integration involves displaying separate tabs (session thumbnails) within one tabbed bar in the management UI. Thumbnails and key status information indicators are used for sessions that are currently active. For a currently inactive session, a tab is provided in the management UI such that the user may click on the tab, or a pushbutton surfaced on the tab, to quickly initiate an application (tool) associated with that tab.

Embodiments of the invention are useful for remote management in applications such as AMM (IBM Advanced Management Module) to provide a remote out-of-band session (not through the operating system, and appearing as if locally connected) with a server such as a blade server. In one embodiment, the invention integrates the remote sessions and corresponding server UI elements in a single management UI, wherein each UI element is simply accessible via a tabbed user interface and session thumbnail.

The management UI integrates potentially independently developed tools (applications) and displays corresponding UI elements for user selection and utilization in managing one or more servers from an integrated UI.

Figure 3A:
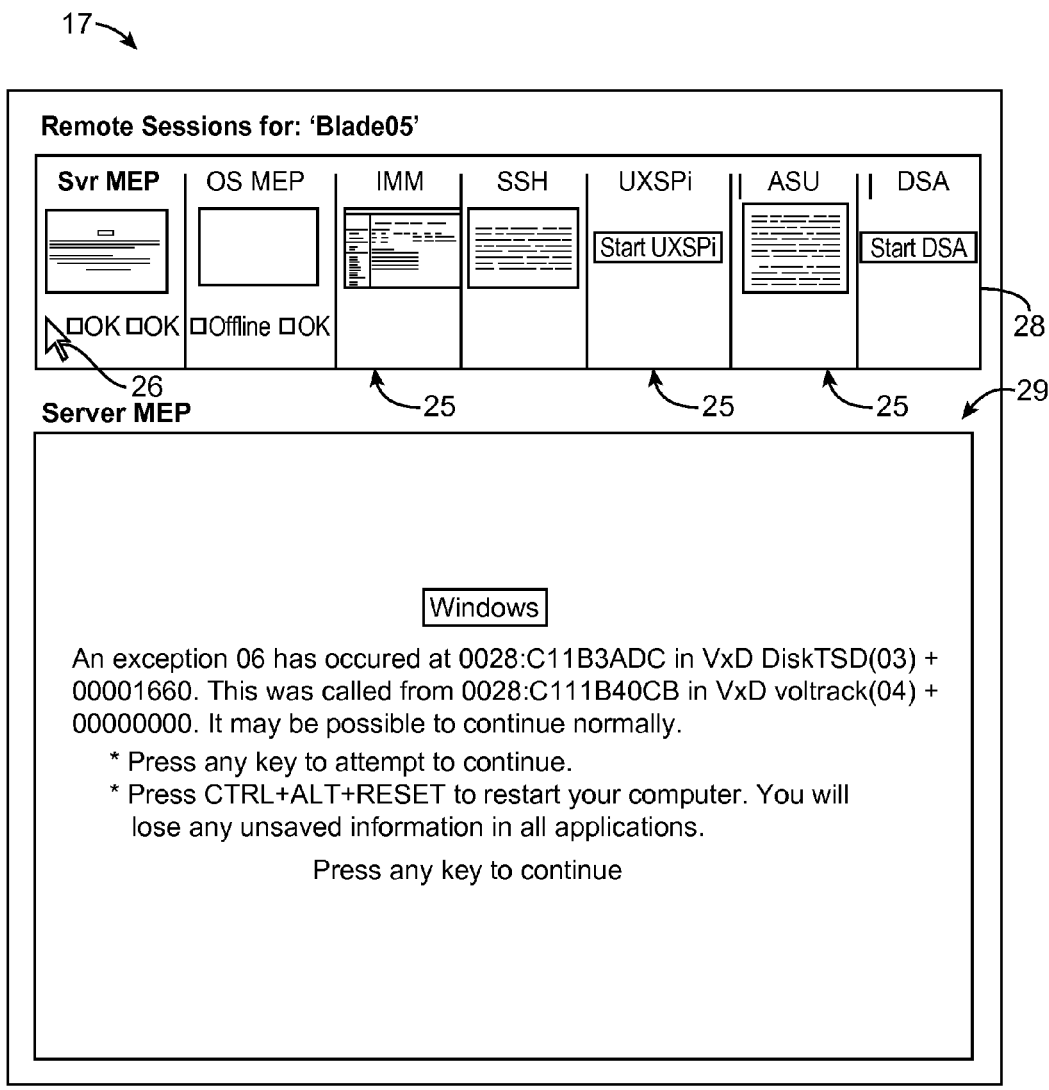
FIG. 3A illustrates another management user interface comprising a tabbed session window including UI elements for managing tools and/or multiple computing resources using content presentation, according to another embodiment of the invention.

FIG. 3A shows a management UI window 17 according to another embodiment of the invention. The management UI window 17 comprises a set of UI elements 25, such as dynamic thumbnail tabs, for various remote sessions, consoles, and tools in a UI bar 28 at the top of the management UI window 17. In this example, the management UI window 17 includes dynamic thumbnail tabs 25 representing remote sessions at a administration console 12, for managing components of a server 13 such as a blade server (e.g., Blade05).

The user selects a thumbnail 25 for a higher-level management session (e.g., Director Appliance) to investigate a server (i.e., Svr MEP) that was reported to be having a problem. The user observes the problem by viewing the dynamic thumbnail 25 for the server Svr MEP.

Figure 3B:
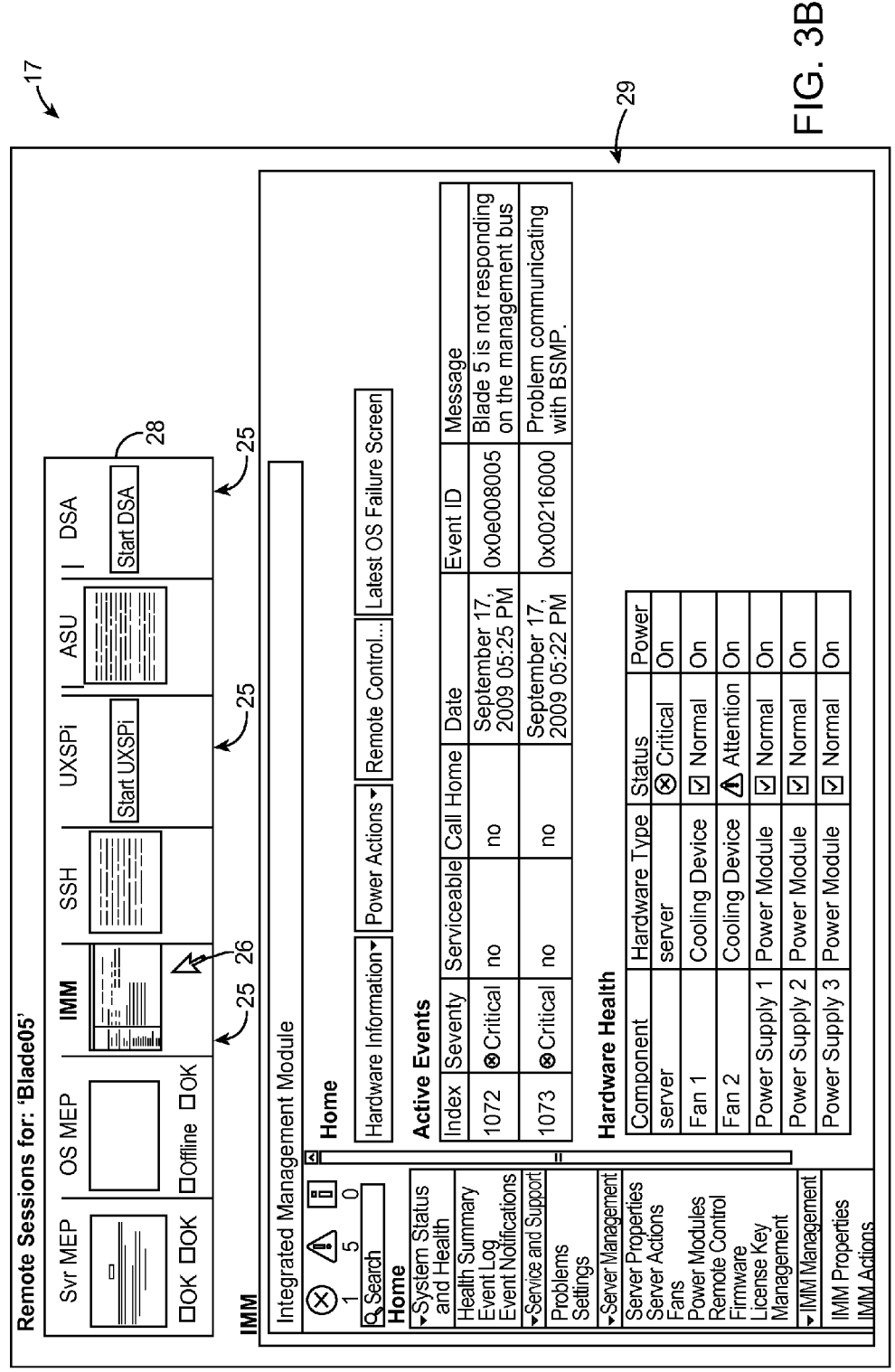
FIG. 3B illustrates a tabbed session window including tabbed thumbnails, and example user interaction with the tabbed thumbnails for managing tools and/or multiple computing resources using content presentation, according to one embodiment of the invention.

The dynamic thumbnails 25 provide efficient and random-access selection capability to the user, wherein the user via a single click of a mouse pointer 26 is provided with a panel 29 which in this example is an enlarged view of the thumbnail as screen output of server Svr MEP. The user then utilizes the panel 29 as a management console for managing server Svr MEP, as shown in FIG. 3B. The user clicks on IMM thumbnail/tab to view a management console (such as display screen and user interface) for interacting with, and managing, IMM computing resource via an administration console 12.

Figure 3C:
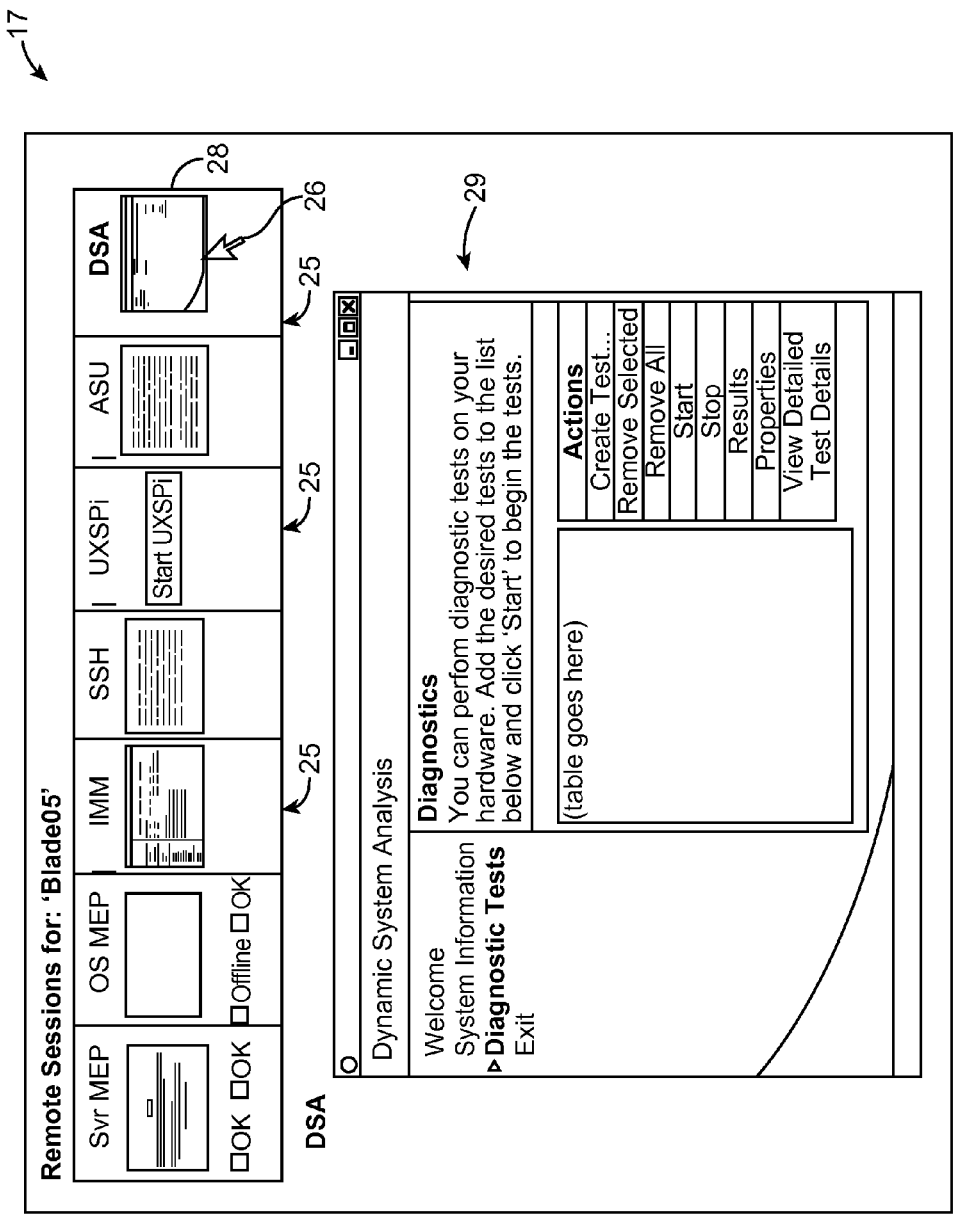
FIG. 3C illustrates a tabbed session window including tabbed thumbnails, and another example user interaction with the tabbed thumbnails for managing tools and/or multiple computing resources using content presentation, according to one embodiment of the invention.

For diagnosing Blade05, a thumbnail 25 is provided on the tab bar 28 as a DSA thumbnail (push button). The user selects the DSA thumbnail to initiate a DSA tool panel 29 for diagnosing Blade05 as shown by example in FIG. 3C.

According to embodiments of the invention, utilizing remote sessions and computing resource interface panels as thumbnail tabs 25 on a tabbed bar 28 in a management UI session window 17, an operator can switch among the various thumbnail tabs 25 for managing various servers and server components. In one example, this allows cut and pasting, and using information and functions from multiple panels 29 to manage servers. The thumbnails 25 allows the user to preemptively use information such as initiating a long-running task using a thumbnail tab 25, while using another thumbnail tab 25 for monitoring the long running task via its thumbnail.

According to an embodiment of the invention, a RS is established for a computing resource (e.g., a server 13, a component of a server 13, an application/tool 22A, etc.) at an administration console 12 (FIG. 1A), wherein the management module 19 causes the GUI module 16 to display a corresponding UI element 25 for the computing resource in a management session comprising the tabbed UI session window 17, on the display screen 15. In one embodiment, a UI element 25 displays status information for the corresponding managed computing resource as obtained from the management server 11. A user may utilize an input device 14 (e.g., a pointer such as a mouse or touch screen) to manipulate each UI element 25 in a management session window 17 as controlled by the GUI module 16.

According to an embodiment of the invention, an administration console comprises a remote administration console, wherein the management module 19 maintains a remote session RS for computing resource that is managed by that remote administration console 12. As such, there is a remote session RS for each managed computing resource. Each remote session RS has a corresponding UI element 25 in the management UI session window 17 that is associated with the corresponding computing resource. The management UI session window 17 displays information including information about the computing resources that are made accessible to the remote consoles via the controller module 20 of the management server 11 (and additional management servers 11 as may be needed).

In one embodiment of the invention, each thumbnail UI element 25 provides status information for a corresponding computing resource, in a tabbed management UI session window 17. In general terms, a thumbnail is a reduced version of a window in a UI, wherein the thumbnail occupies a smaller area of the display screen than the window itself and typically displays a subset of the information of the window.

In one embodiment of the invention, said management module 19 monitors user interaction with each UI element 25, by detecting user interaction with the UI elements 25 (such as clicking on a UI element 25). In one embodiment, the management module 19 communicates the user interaction information to the controller module 20 of the management server 11, which prompts the controller module 20 to transmit additional or updated status information for one or more computing resources to the management module 19 for display in the management UI session window 17 of the administration console 12, and/or or send control information from the administration console 12 to the computing resource.

The controller module 20 maintains a server session (SS) for each managed computing resource. Each server session SS at the management server 11 for an associated managed computing resource, is associated with a corresponding remote session RS at a administration console 12. In one embodiment of the invention, a server session SS comprises a module providing a session management process for processing status/control information for the corresponding managed computing resource. In one embodiment, a remote session RS comprises a module providing a session management process for keeping track of user activity and interaction with the administration console (such as with a UI element associated with a corresponding remote session RS).

In one embodiment, when a user interacts with a thumbnail tab 25 by providing input using an input device such as a mouse pointer, the system displays a content element for the thumbnail tab 25 (e.g., a tabbed window panel 28) on the display screen.

In one embodiment of the invention, a managed computing resource may have one or more dynamic sessions at an administration console 12 (e.g., a remote session with an operating system, and also an out-of-band session). In that case such a computing resource has multiple thumbnail tabs 25, and corresponding RS sessions and SS sessions.

In one embodiment of the invention, the management module (i.e., monitoring module) 19 at the administration console 12 is configured to refresh one or more thumbnail tabs 25 in the session window 17 with full/partial refresh information from the management server 11. One or more thumbnail tabs 25 may be less frequently refreshed, or refreshed with less information (e.g., with lower color depth and resolution).

Figure 4:
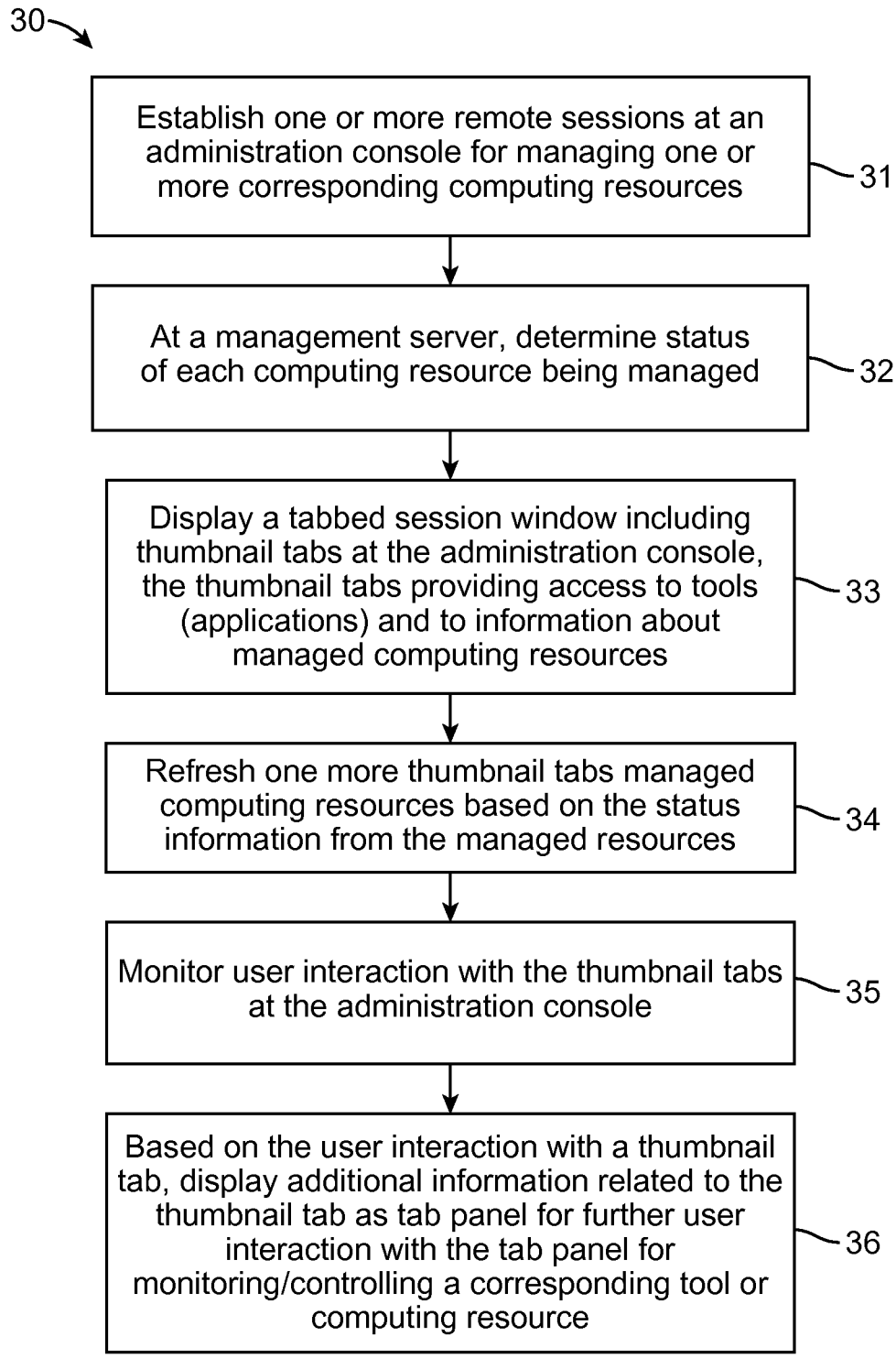
FIG. 4 illustrates a process flowchart for content presentation, according to one embodiment of the invention.

FIG. 4 shows a flowchart of a process 30, according to an embodiment of the invention, comprising the following process blocks:

Block 31: Establish one or more remote sessions at an administration console for managing one or more corresponding computing resources.

Block 32: At a management server, determine status of each computing resource being managed.

Block 33: Display a tabbed session window including thumbnail tabs at the administration console, the thumbnail tabs providing access to tools (applications) and to information about managed computing resources.

Block 34: Dynamically refresh one more thumbnail tabs managed computing resources based on the status information from the manages resources.

Block 35: Monitor user interaction with the thumbnail tabs at the administration console.

Block 36: Based on the user interaction with a thumbnail tab, display additional information related to the thumbnail tab as tab panel for further user interaction with the tab panel for monitoring/controlling a corresponding tool or computing resource.

In one example, process block 34 involves dynamically selectively obtaining and/or displaying information (e.g., server status) from the management server to the administration console over the communication link for one or more UI elements needing refresh. The quantity of refresh information requested/received for each managed computing resource can be a function of the display status (e.g., visible portion, thumbnail, window) of the session at the administration console for the managed computing resource.

In one example, process block 34 involves updating the thumbnail tab for a tool (application) 22A (FIG. 1A) as the tool executes. For example, a tool such as DSA (IBM Dynamic System Analysis) collects diagnostic information that can take minutes to execute. The user at console 12 may start the diagnostics on the DSA thumbnail/tab, and then switch to another thumbnail/tab in the session window 17 to do other work while peripherally monitoring the progress on the DSA thumbnail to show signs of the task being completed. In one example, the tools/applications 22A may comprise components in the local consoles 12, in the management server 11, and/or in one or more servers 13.

Embodiments of the invention are also useful with other collections of servers, such as rack-optimized servers, and for other data center equipment such as storage and networking devices. As such, embodiments of the invention provide a one-stop full-problem view for monitoring, and dealing with, problem servers (e.g., servers that are underperforming, require maintenance, have abnormal status).

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
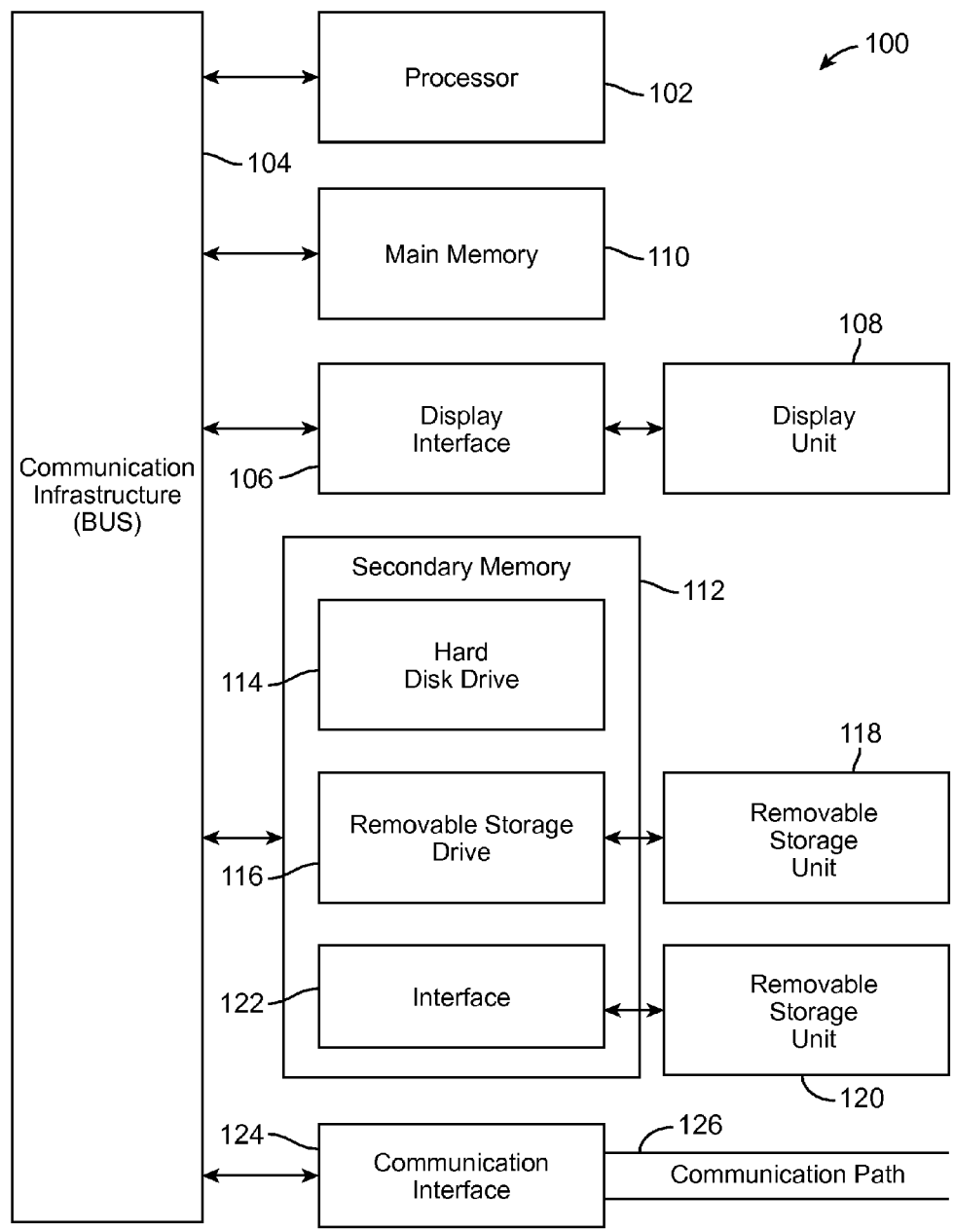
FIG. 5 illustrates a high level block diagram of an information processing system useful for implementing one embodiment of the invention.

FIG. 5 is a high level block diagram showing an information processing system 100 useful for implementing one embodiment of the present invention. The computer system 100 includes one or more processors, such as one or more processors 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc., which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via a communication interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of computing resource management, comprising:
   maintaining plural sessions for managing plural computing resources using an administration console;
   maintaining a management user interface on an electronic display screen of the administration console, the management user interface comprising plural visual tabbed user interface elements, wherein each user interface element corresponds to a session for remotely managing a computing resource via a communication link, wherein managing a computing resource comprises monitoring and controlling the computing resource, wherein controlling the computing resource comprises sending control information to the computing resource;
   dynamically refreshing the status of each computing resource in a corresponding user interface element tab in the management user interface based on a visible portion of the display screen;
   monitoring user interaction with a user interface element based on user input;
   based on the user interaction with a user interface element, displaying a panel on the display screen for the user managing the corresponding computing resource; and
   selectively transmitting a quantity of refresh information for a user interface element from a management server to the administration console for display in the user interface element, wherein the quantity of refresh information transmitted is a function of display status for the corresponding computing resource on the administration console, wherein the refresh information comprises status information for the corresponding computing resource, wherein the display status comprises one of a thumbnail and a window.

2. The method of claim 1 wherein a computing resource comprises a server system, wherein the administration console sends the control information to the computing resource.

3. The method of claim 1 wherein a computing resource comprises an application module.

4. The method of claim 1, wherein the panel comprises a remote session window, and multiple computing resources are managed using multiple panels.

5. The method of claim 1, wherein a user interface element comprises a thumbnail tab including a screen output of a corresponding virtual machine (VM) at a server, wherein multiple VMs running on the server are monitored and controlled.

6. The method of claim 5, further comprising selectively providing additional visual information for a thumbnail tab to alert a user to status of a corresponding computing resource.

7. The method of claim 5, wherein said panel comprises an enlarged view of the corresponding thumbnail enabling user interaction with the corresponding computing resource.

8. The method of claim 1, further comprising:
   selectively transmitting a quantity of refresh information for a panel from a management server to the administration console for display in the panel, wherein the refresh information comprises status information for a corresponding computing resource.

9. A computer program product for computing resource management comprising:
   a non-transitory computer usable storage medium having computer readable program code embodied therewith for execution on a computer, the computer readable program code configured to:
   maintain plural sessions for managing plural computing resources using an administration console;
   maintain a management user interface on an electronic display screen of the administration console, the management user interface comprising plural visual tabbed user interface elements, wherein each user interface element corresponds to a session for remotely managing a computing resource via a communication link, wherein managing a computing resource comprises monitoring and controlling the computing resource, wherein controlling the computing resource comprises sending control information to the computing resource;
   dynamically refresh the status of each computing resource in a corresponding user interface element tab in the management user interface based on a visible portion of the display screen;

monitor user interaction with a user interface element based on user input;

based on the user interaction with a user interface element, display a panel on the display for the user managing the corresponding computing resource; and selectively transmit a quantity of refresh information for a user interface element from a management server to the administration console for display in the user interface element, wherein the quantity of refresh information transmitted is a function of display status for the corresponding computing resource on the administration console, wherein the refresh information comprises status information for the corresponding computing resource, wherein the display status comprises one of a thumbnail and a window.

10. The computer program product of claim 9, wherein a computing resource comprises one or more of: a server system, and an application module.

11. The computer program product of claim 9, wherein the panel comprises a remote session window, and multiple computing resources are managed using multiple panels.

12. The computer program product of claim 9, wherein a user interface element comprises a thumbnail tab including a screen output of a corresponding virtual machine (VM) at a server, wherein multiple VMs running on the server are monitored and controlled.

13. The computer program product of claim 12, wherein the computer readable program code is configured to:

selectively provide additional visual indicators for a thumbnail tab to alert a user to status of a corresponding computing resource.

14. The computer program product of claim 12, wherein said panel comprises an enlarged view of the corresponding thumbnail enabling user interaction with the corresponding computing resource.

15. A system for computer resource management, comprising:

a management module using a hardware processor for maintaining plural sessions for managing plural computing resources using an administration console;

a user interface module using the hardware processor for maintaining a management user interface on an electronic display screen of the administration console, the management user interface comprising plural visual tabbed user interface elements, wherein each user interface element corresponds to a session for remotely managing a computing resource via a communication link, wherein managing a computing resource comprises monitoring and controlling the computing resource, wherein controlling the computing resource comprises sending control information to the computing resource; and the management module further using the hardware processor for dynamically refreshing the status of each computing resource in a corresponding user interface element tab in the management user interface based on a visible portion of the display screen, and monitoring user interaction with a user interface element based on user input, wherein based on the user interaction with a user interface element, the monitor module causes display of a panel on the display for the user managing the corresponding computing resource, and for selectively transmitting a quantity of refresh information for a user interface element from a management server to the administration console for display in the user interface element, wherein the quantity of refresh information transmitted is a function of display status for the corresponding computing resource on the administration console, wherein the refresh information comprises status information for the corresponding computing resource, wherein the display status comprises one of a thumbnail and a window.

16. The system of claim 15, wherein a computing resource comprises one or more of: a server system, and an application module.

17. The system of claim 15, wherein:

the panel comprises a remote session window;

a user interface element comprises a thumbnail tab;

the management module further selectively provides additional visual information for a thumbnail tab to alert a user to status of a corresponding computing resource; and said panel comprises an enlarged view of the corresponding thumbnail enabling user interaction with the corresponding managed computing resource.

* * * * *